(12) United States Patent
Davies et al.

(10) Patent No.: US 8,051,271 B2
(45) Date of Patent: Nov. 1, 2011

(54) TRANSLATION OF VIRTUAL TO PHYSICAL ADDRESSES

(75) Inventors: Jeremy Piers Davies, Cambridge (GB); David Hennah Mansell, Cambridge (GB); Richard Roy Grisenthwaite, Cambridge (GB)

(73) Assignee: ARM Limited, Cambridge (GB)

( * ) Notice: Subject to any disclaimer, the term of this patent is extended or adjusted under 35 U.S.C. 154(b) by 611 days.

(21) Appl. No.: 12/216,253

(22) Filed: Jul. 1, 2008

(65) Prior Publication Data
US 2010/0005269 A1    Jan. 7, 2010

(51) Int. Cl.
*G06F 12/02*    (2006.01)
(52) U.S. Cl. .................. 711/203; 711/134; 711/E12.002
(58) Field of Classification Search .................. 711/203, 711/134, E12.002
See application file for complete search history.

(56) References Cited

U.S. PATENT DOCUMENTS
6,519,684 B1 *  2/2003  Moyer .......................... 711/134
* cited by examiner

*Primary Examiner* — Yong Choe
(74) *Attorney, Agent, or Firm* — Nixon & Vanderhye P.C.

(57) ABSTRACT

Address translation circuitry for translating virtual addresses to physical addresses for a data processor in response to access requests from said data processor targeting virtual addresses is disclosed. The address translation circuitry comprises: a data store comprising a plurality of entries for storing a plurality of mappings of ranges of virtual addresses to ranges of physical addresses for said data processor and additional data associated with each of said plurality of mappings within a table; updating circuitry for updating said table in response to an access request for a virtual address that is not mapped by said table, said updating circuitry being responsive to receipt of a mapping for said virtual address to: select a plurality of entries in said table suitable for storing said received mapping; and determine one of said plurality of selected entries to be overwritten by said received mapping in dependence upon at least a portion of said additional data stored in said one of said plurality of selected entries.

18 Claims, 3 Drawing Sheets

TRANSLATION OF VIRTUAL TO PHYSICAL ADDRESSES

BACKGROUND OF THE INVENTION

1. Field of the Invention

The field of the invention relates to data processing and in particular to the conversion of virtual addresses produced by a processor to corresponding physical addresses in order to access data stored in a physical address.

2. Description of the Prior Art

It is known in data processing systems for processors to refer to storage locations using virtual addresses, while the data itself is stored in a location identified by a physical address. When accessing this data any virtual address produced by the processor will need to be converted to a physical address. This can slow the procedure, as the data cannot be accessed until it is converted to a physical address.

A known way of converting a virtual address to a physical address is by the use of a translation lookaside buffer (TLB). The TLB receives a virtual address from a processor and converts it to a physical address. The TLB is quick and easy to access and therefore performs the conversion relatively quickly. However, the TLB does not store a complete mapping of virtual to physical addresses only storing a subset, this subset generally being mappings that have been used recently. Thus, it may be that a data access requests a virtual address that is not stored in the TLB. In such a case the data processor will need to retrieve this information, usually from a table in main memory. Compared to the TLB access this is a relatively lengthy and power costly operation. The TLB will then be updated with this recently accessed information. To do this an entry to be overwritten will need to be selected.

The TLB may be arranged in a number of ways. In a fully associative TLB all entries in the TLB are available for selection, while in a set associative TLB there is a smaller selection of possible storage locations for an entry. In systems of the prior art the selection of which entry to overwrite has conventionally been made either randomly, or in a "round robin" way such that the oldest entry is selected, or in a way such that the least recently accessed entry is selected. The choice has an impact on performance as a miss in the TLB will require a memory access and extra time and power to be consumed, thus, overwriting an entry that would later have been used will damage performance.

It would be desirable to be able to consistently select entries that are unlikely to be used again soon.

SUMMARY OF THE INVENTION

A first aspect of the present invention provides address translation circuitry for translating virtual addresses to physical addresses for a data processor in response to access requests from said data processor targeting virtual addresses, said address translation circuitry comprising: a data store comprising a plurality of entries for storing a plurality of mappings of ranges of virtual addresses to ranges of physical addresses for said data processor and additional data associated with each of said plurality of mappings within a table, said data processor being responsive to said access requests to access said table to retrieve a corresponding mapping and to access a further store of mappings if said corresponding mapping is not present in said table; updating circuitry for updating said table in response to an access request for a virtual address that is not mapped by said table, said updating circuitry being responsive to receipt of a mapping for said virtual address to: select a plurality of entries in said table suitable for storing said received mapping; and determine one of said plurality of selected entries to be overwritten by said received mapping in dependence upon at least a portion of said additional data stored in said one of said plurality of selected entries.

The present invention recognises that there is conventionally additional data stored alongside virtual address to physical address mappings and that this data may have a bearing on how likely it is that the mapping will be needed again in the near future. Thus, when selecting an entry in the data store to update, the present invention uses at least a portion of this additional data in its decision of what mapping to overwrite. In this way the present invention makes use of what is already stored to increase the probability of not overwriting a mapping that will be needed again shortly.

In some embodiments, said updating circuitry is adapted to read said plurality of selected entries and to compare said at least a portion of said additional data stored in each of said plurality of selected entries with a corresponding at least a portion of additional data to be stored associated with said received mapping and to select an entry where said portions of additional data do not match as said entry to update.

If an entry is not present in the data store then the mapping is retrieved from elsewhere. The mapping that is retrieved will then be stored in the data store along with additional data associated with that mapping. Embodiments of the present invention recognise that as this additional data is required for the updating of the table it is available and thus, can also be used in a comparison with a corresponding portion of the additional data associated with entries in the table that can potentially be updated and mappings where there is no match of their associated additional data are preferentially selected over mappings where there is a match. It should be noted that when performing the comparison the additional data associated with the newly retrieved mapping may be taken from the source of this additional data which may for example be a register storing this information or it may be taken from a place where it is already stored associated with the mapping.

In some embodiments, said mappings comprise a part of said virtual address, a corresponding part of said physical address and said additional data comprises attribute data, said attribute data being indicative of a state of said data processor associated with said mapping.

Although the additional data can comprise a number of things in some embodiments it comprises attribute data that is indicative of a state of the data processor associated with the mapping. Mappings are often stored with information relating to the state of the data processor at the time that the mapping was stored in the data store. This data can be useful for determining if the mapping is to be used again soon. For example, if the current state of the data processor is similar to or the same as the state of the data processor when the mapping was stored in the data store, i.e. the at least a portion of the attribute data matches the attribute data of the current mapping then it is likely that this mapping will be used again and therefore it should not be overwritten. This is because data processors operate in a particular memory region when in a certain state and thus, the state of the processor may provide an indication of the memory region it is operating in.

In some embodiments, said attribute data comprises an address space identifier said address space identifier identifying an address space associated with said mapping, said at least a portion of said additional data determining said updating selection comprising said address space identifier.

A mapping may have an address space identifier stored associated with it. An application typically has an address space identifier or ASID associated with it as an application generally uses a particular address space and thus, an ASID which identifies that address space also identifies the application. Thus, if there is the same ASID associated with the current mapping as with a stored mapping then it can hit in the TLB and hence be of use. If the mapping is marked with a different ASID then it cannot be of use and thus, unless the ASID changes, which happens infrequently compared to TLB misses, these entries are unlikely to be needed and as such are good candidates for being overwritten. In this respect it should be noted that applications operate in particular address spaces. It should also be noted that in some cases different applications may operate in the same address space in which case, they may have the same address space identifiers despite being different applications. In such a case, the address space identifier is not unique to an application but is used by several applications, all of which use the same address space. In either case, a match of ASIDs is a good indicator that the associated mapping will be needed again in the near future.

In some embodiments, said attribute data comprises a global identifier said global identifier indicating whether or not a mapping is specific to a particular address space or applies to all address spaces, said at least a portion of said additional data determining said updating selection comprising said global identifier.

The attribute data may comprise a global identifier, this would generally be set for mappings used by the kernel of the operating system running on the data processor. In this case the mapping applies regardless of the current ASID. Therefore, if the received mapping has a global identifier set then it is advantageous not to overwrite a mapping that also has a global identifier set if there is a choice.

In some embodiments, said attribute data comprises an address space identifier said address space identifier identifying an address space associated with said mapping and a global identifier said global identifier indicating whether or not a mapping is specific to a particular address space or applies to all address spaces.

Mappings may have both address space identifiers and global identifiers associated with them and these can both be used when selecting an entry to update. In this case, mappings with address space identifiers that match are the ones that it is preferred to keep and therefore not overwrite followed by those that have a global identifier that indicate that they may be applicable to all address spaces. Those that don't have a global identifier and don't have an address space identifier that match will be preferentially overwritten if they exist.

In some embodiments, storage in said table is arranged such that a mapping of a range can be stored in one or more predetermined entries in said table in dependence upon said range of addresses mapped.

The storage in the table may be arranged so that memory ranges can only be stored in predetermined entries within the table rather than in any entry. Arranging the table like this makes it easier to access an entry as only certain ones need to be checked. Given this arrangement, it is only those entries that are designated for storing a particular mapping that can be updated with the new mapping.

In some embodiments, said ranges of addresses are pages and said table is adapted to store mappings for different sized pages, a mapping for each page of each size having at least one predetermined entry in said table for its storage.

Mappings can be made for different sized pages depending on the processor that is using the mappings. Thus, in such a case a mapping may be found in several different entries, entries for each page size relating to that mapping.

In some embodiments, said data store comprises a plurality of ways each having a plurality of entries, such that said mapping of said range can be stored in any one of said plurality of ways corresponding to said one or more predetermined entries in said table suitable for storing said mapping.

In many embodiments, the data store comprises a plurality of ways each having a plurality of entries. Thus, a mapping of a page is indexed to determine an entry in the table and the corresponding entry in each of the ways can be used to store the entry. Thus, any of these entries can be updated with the newly retrieved mapping when the mapping wasn't originally stored in the table.

In some embodiments, in response to said attribute data not matching for two or more of said plurality of entries, said updating circuitry is adapted to preferentially select one of said two or more entries having a global identifier indicating that a mapping applies to a particular address space over an entry having a global identifier indicating that a mapping applies to all address spaces.

Although the attribute data can be used to rule out mappings that it is not desirable to overwrite, it may be that there are more than one entry that are not ruled out from the address space data matching. In such a case the global identifier can then be used to select the mapping entries that have a global identifier associated with them as ones that should not be updated and those without a global identifier as those that should be preferentially updated.

It may be that after all of the selection criteria, there are still more than one entry that it is possible to update and that have not been ruled out as being preferred to keep. It may alternatively be that all of them have the same address space identifier and as such are all equally preferable to keep. In such a case, a number of different criteria can be used to select the entry to overwrite. In one embodiment, a round robin method is used in which the oldest entry is selected. In another embodiment the entry that was updated least recently is used. This is a good selection criteria that selects a mapping that is least likely to be used but requires additional logic to monitor which mapping was used most recently.

In other embodiments, the entry is selected randomly from those that have the same selection preferences with regard to their attribute data.

Although, the data can comprise a number of things in many embodiments it comprises a translation lookaside buffer.

A further aspect of the present invention provides a method of selecting an entry to update in a data store storing a table comprising a plurality of mappings of ranges of virtual addresses to ranges of physical addresses for a data processor, said plurality of mappings being a subset of said total number of mappings for said data processor comprising the steps of: receiving an access request from said data processor targeting a virtual address; determining if there is an entry in said table for said virtual address requested; in response to detecting no entry for said virtual address obtaining said mapping; selecting an entry in said data store to update with said obtained mapping; wherein said step of selecting said entry comprises selecting a plurality of entries in said table suitable for storing said obtained mapping and determining one of said entries to be overwritten by said received mapping in dependence upon a portion of said mapping stored in said one of said plurality of entries.

The above, and other objects, features and advantages of this invention will be apparent from the following detailed

DESCRIPTION OF THE PREFERRED EMBODIMENTS

Figure 1:
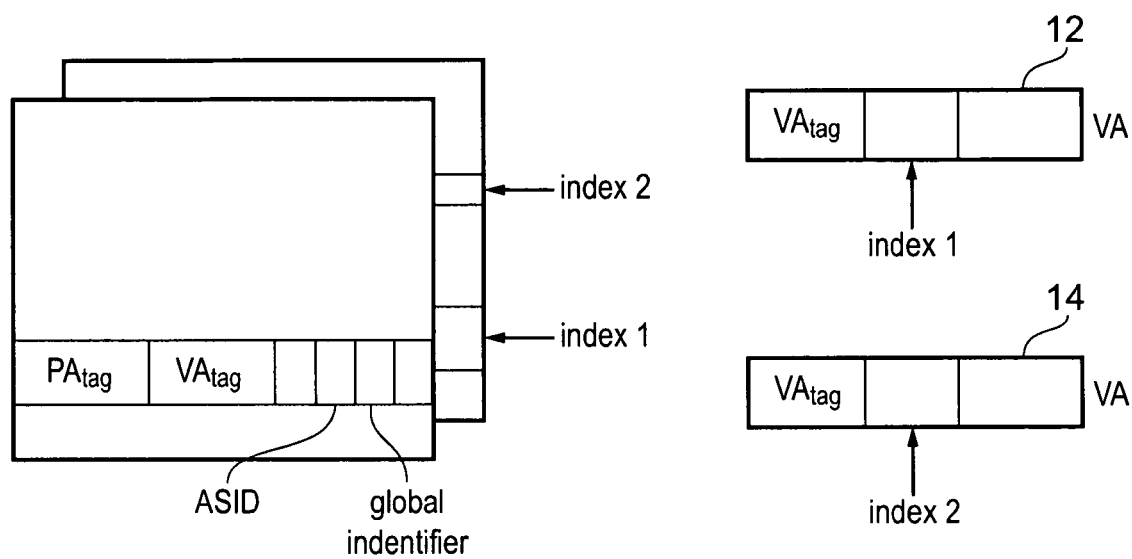
FIG. 1 schematically shows a TLB that is used in embodiments of the present invention.

FIG. 1 shows a TLB 10 that is used in embodiments of the present invention. TLB 10 stores mappings of physical address to a virtual address pages. Each entry in the table stores one mapping. Each mapping comprises a virtual address tag, a corresponding physical address tag and other attribute information concerning the state of the processor when the mapping was stored. This comprises among other things an address space identifier or ASID and a global identifier. The ASID indicates an address space and as an application typically runs within a particular address space it may be used to indicate an application that was running when this mapping was stored. The global identifier indicates whether or not the mapping is applicable to all address spaces or is address space specific. In other words it generally represents whether or not the mapping was generated when the kernel of the system was running rather than a specific application. This is because the kernel is responsible for supervising the various applications and is generally not restricted to a particular address space.

In some embodiments, multiple applications use the same memory space. In such cases although they are different applications they will share an ASID.

A virtual address can be split into different portions. One portion is the index and another portion is the tag. In the TLB, the index determines the line it is stored in and the tag is stored in that line along with the tag of the corresponding physical address. The virtual addresses are mapped in the TLB as pages. The size of the tags that are stored depends on the size of the page. For larger pages the tag will be smaller as it is only a few of the upper bits that are mapped whereas the smaller pages will have tags that are larger as more bits are mapped. In some TLBs pages of multiple sizes may be mapped.

Virtual address 12 shows the size of the tag and index where a large page size is mapped. In this case the VA tag is relatively small and the index is a few high number bits. Virtual address 14 is mapped on a smaller page size and thus the VA tag is larger and the index is different lower bits of the virtual address. In this embodiment, TLB 10 is stored in a set associative way with multiple ways for each index. In such an arrangement a virtual address entry can only be stored in a line indicated by its index. However, it can be stored in any of the different ways. Thus, in this embodiment the virtual addresses 12 and 14 each have two possible storage locations in the table, a line indicated by index 1 or by index 2 respectively and in either of the two ways. It should be noted that data for a particular address may be mapped by pages of different sizes and this can provide a potential number of different indexes where the mapping might be found. However, one address will only be mapped by one sized page at any one time.

Although in this embodiment two ways are shown for ease of drawing it should be appreciated that in many embodiments there will be more ways than this.

Figure 2:
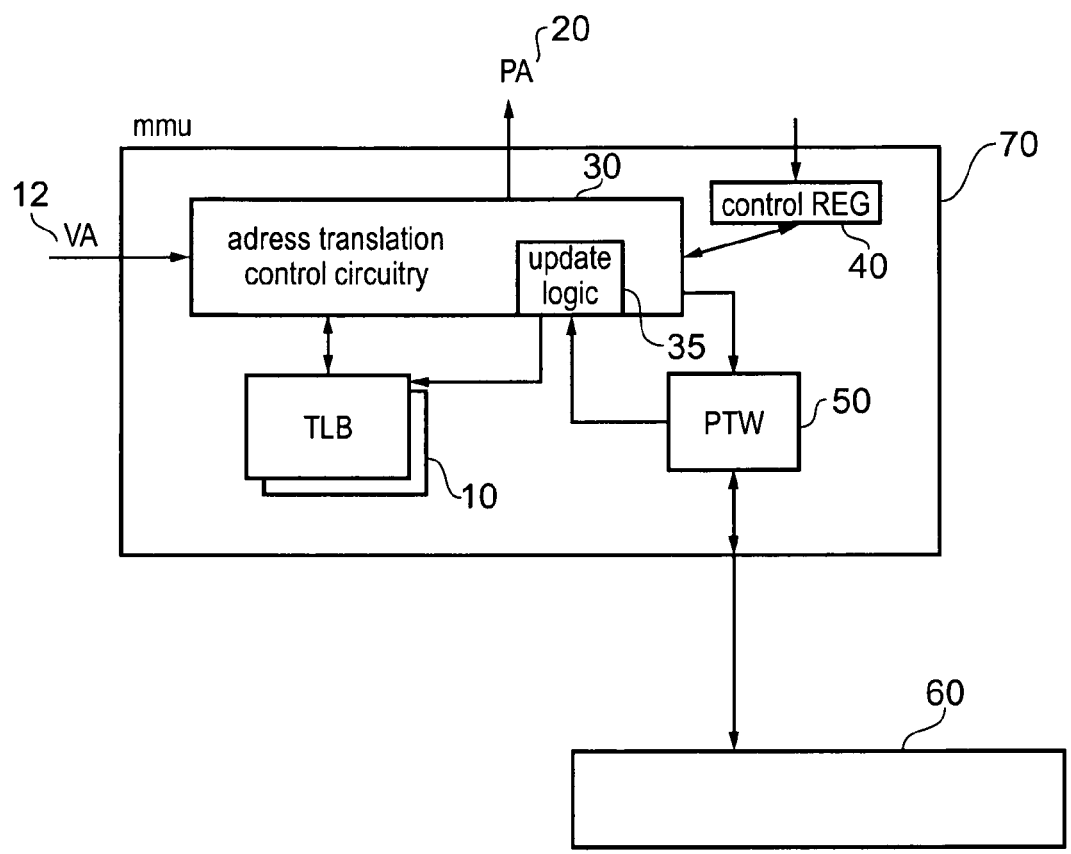
FIG. 2 shows a memory management unit according to an embodiment of the present invention.

FIG. 2 shows a memory management unit 70 comprising address translation control circuitry 30, a TLB 10 and page table walk logic 50. Memory management unit 70 receives a request for a virtual address 12 and this is input to address translation control circuitry 30 which looks to see if it is stored in the TLB 10. If it is, the corresponding physical address 20 is output. If it is not then page table walk logic 50 is triggered to go and look for the virtual address to physical address mapping which will be stored in a page table in memory 60. When the mapping has been retrieved from the page table in memory 60 the page table walk logic 50 provides the mapping to address translation control circuitry 30 via update circuitry 35 and the address translation control circuitry outputs the physical address 20. Update circuitry 35 then acts to update the TLB 10 with this new mapping.

In order to store the new mapping in TLB 10 a currently stored mapping will need to be overwritten. In this embodiment TLB 10 is a set associative data store with several ways. Thus, there are a plurality of entries that are indexed by the virtual address that can store this particular mapping. The update logic looks at these potential entries and determines which one it wishes to overwrite in dependence upon properties of the processor state that generated the current virtual address.

As mentioned previously mappings in TLB 10 contain in addition to the physical address and virtual address tags, information regarding the state of the processor when the mapping was stored. This information will also be available with the incoming mapping which is going to be stored in TLB 10. In this embodiment, this information is retrieved by the update logic 35 from control registers 40 within the MMU 70 that store information relating to the state of the processor. In some embodiments the control registers 40 will not be in the MMU but this information will be sent to the MMU from the processor as control signals. The update logic 35 considers whether the current virtual address access request has been generated by the kernel in which case the global identifier in control registers 40 will be set and/or whether it has been generated by or relates to a particular address space. It then uses this information to preferentially select an entry to overwrite. Table 1 below shows a preferential list of entries that it is most desirable to replace and those that it is least desirable to replace for incoming entries that either have their global identifier set and those that don't.

| INCOMING ENTRY HAS GLOBAL SET | INCOMING ENTRY HAS GLOBAL CLEAR |
|---|---|
| Global Clear, ASID non-matching | Global Clear, ASID non-matching |
| Global Clear, ASID matching | Global Set |
| Global Set | Global Clear, ASID matching |

Thus, embodiments of the present invention recognise that the information regarding the state of the processor when mappings in the TLB were created is stored alongside these mappings and this information is relevant to how likely it is that the mapping will be used again. Thus, this information is used to determine which entries to overwrite with a new entry.

In this respect, if the incoming entry has the global identifier set then it has been generated by the kernel and it is using a memory space that is applicable to all applications and all address spaces. It will also have an ASID identifier associated with it, and this may indicate that the data that is being manipulated by the kernel is relevant for that particular address space. Thus, the entries that it is most desirable to replace are those that have the global clear and the ASID non-matching. In other words they are using memory space that is applicable to a different address space and not the address space that the incoming entry relates to. The next most desirable is if the global is clear and the ASID is matching and then the least desirable is the global set. These criteria are used to differentiate between entries in the first place. It may be that all the entries have the same global and ASID identifiers or at least some of them do and that a single entry cannot be selected in this way. In such a case, the entries it is most desirable to keep are eliminated from the possibility of being overwritten and then the final entry can be selected in a number of different ways. It may be selected randomly, it may be selected on the basis of being the oldest entry, i.e. the last one to have been updated, or it may be selected on the basis of being the one least recently used. In regards to selecting it in all cases except for the random case, additional information needs to be stored alongside TLB 10, such that the correct entry can be selected according to the particular criterion.

If the incoming entry has global clear, i.e the global identifier is not set then this means it was produced by a particular application. In this case, the mapping that it is most desirable to replace is a mapping with global clear and the ASID non-matching, following this it is one with the global set as if the global identifier is set, this means it was produced by the kernel and is applicable to all address spaces and the final most desirable one to keep is one where the global is clear but the ASID is matching. This is because this mapping was produced by an application running in the same address space as the application that is currently running and thus, it is likely that future virtual address accesses will be in this memory space. Once again, if the selection cannot be narrowed down to a single entry then the final selection is made using one of the conventional methods.

Figure 3:
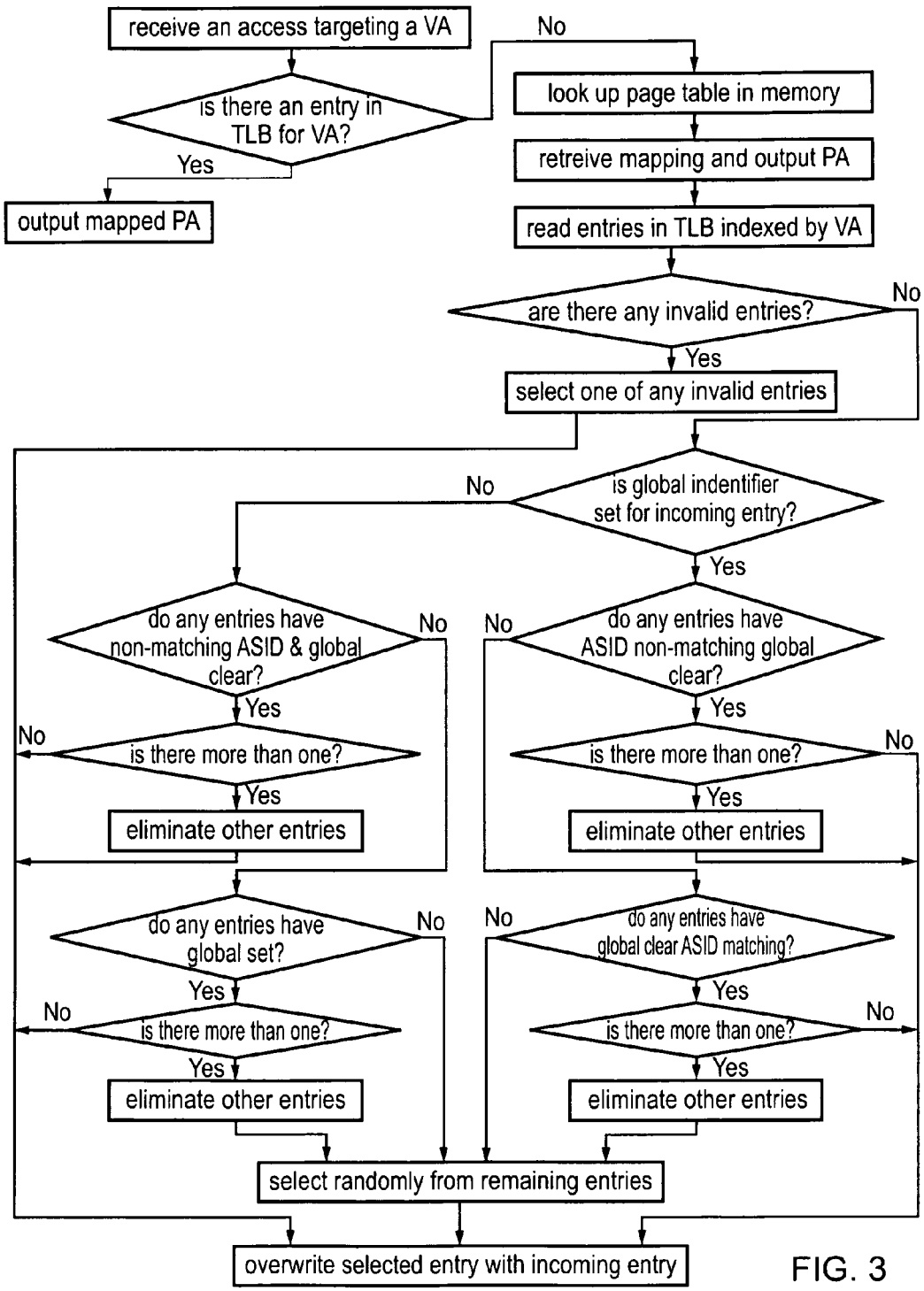
FIG. 3 shows a flow diagram illustrating the steps in a method according to an embodiment of the present invention.

FIG. 3 shows a flow diagram illustrating a method according to an embodiment of the present invention. Initially an access request is received which targets a particular virtual address. It is then determined if there is an entry in the TLB mapping this virtual address. If there is then the physical address that is mapped by this mapping is output and that is the end of the process. If there isn't a mapping in the TLB for this virtual address then the page table in memory is accessed and the relevant mapping retrieved from there. It should be noted that this can be done by page table walk logic or it can be done by software or in a number of other known ways. The physical address that is mapped by the retrieved mapping is then output and entries in the TLB that are indexed by the virtual address and that can therefore be used to store the new mapping are read. Initially it is determined if any of these are invalid entries, these might be present following reset for example when the TLB is yet to be full. If there are any invalid entries then one of these is selected to be overwritten. If there are no invalid entries, as would usually be the case, it is determined if the global identifier is set for the incoming entry.

If it is then the right hand side of the lower part of the flow chart is followed. Firstly it is determined if any of the possible entries have non-matching address space identifiers and global clear. These are the next most desirable entries to overwrite and if there is a match for this then it is determined if there is more than one entry. If there is only one of these entries then this entry is selected as the entry to overwrite with the retrieved mapping. If there is more than one then other entries are eliminated and one entry from the several entries is selected randomly. If there are no entries having ASID non-matching and global clear then it is determined if there are any entries having global clear and ASID matching. Once again if there are, it is determined if there are more than one and if there are then one of these entries is selected randomly. If there is only one of these entries then this entry is selected. If there are none of these entries then an entry is selected randomly from the possible entries.

If the global identifier is not set for the incoming entry then the left hand side of the lower part of the flow chart is followed. Initially it is determined whether or not any entries have non-matching ASIDs and the global clear. If they do then it is determined if there is more than one. If there is only one then this entry is selected to be overwritten by the incoming entry. If there is more than one then the other entries are eliminated and one of these entries is selected randomly as the entry to be overwritten. If none of the possible entries have non-matching ASIDs and global clears it is then determined if any of the entries have a global set. If they do it is determined if there is more than one, if there isn't then that entry is selected to be overwritten. If there is more than one then the other entries are eliminated and a selection is made from those entries randomly. If none of the entries have global set an entry is selected randomly from the possible entries.

Although in this embodiment entries are selected randomly between entries having address space identifiers and global identifiers that are the same it will be clear to a skilled person that other means of selecting between the remaining entries would also be possible. In effect embodiments of the present invention use information stored as additional data with a mapping to determine its future relevance and if it is deemed to have properties in common with an incoming entry then that stored mapping is preferentially retained in the TLB and a different entry without these properties will be selected to be overwritten.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Address translation circuitry for translating virtual addresses to physical addresses for a data processor in response to access requests from said data processor targeting virtual addresses, said address translation circuitry comprising:

a data store comprising a plurality of entries for storing a plurality of mappings of ranges of virtual addresses to ranges of physical addresses for said data processor and additional data associated with each of said plurality of mappings within a table, said data processor being responsive to said access requests to access said table to retrieve a corresponding mapping and to access a further store of mappings if said corresponding mapping is not present in said table;

updating circuitry for updating said table in response to an access request for a virtual address that is not mapped by said table, said updating circuitry being responsive to receipt of a mapping for said virtual address from said further store to:

select a plurality of entries in said table suitable for storing said received mapping; and determine one of said plurality of selected entries to be overwritten by said received mapping in dependence upon at least a portion of said additional data stored in said one of said plurality of selected entries, wherein said updating circuitry is adapted to read said plurality of selected entries and to compare said at least a portion of said additional data stored in each of said plurality of selected entries with a corresponding at least a portion of additional data to be stored associated with said received mapping and to select an entry where said portions of additional data do not match as said entry to update, and said mappings comprise a part of said virtual address, a corresponding part of said physical address and said additional data comprises attribute data, said attribute data being indicative of a state of said data processor associated with said mapping.

2. Address translation circuitry according to claim 1, wherein said attribute data comprises an address space identifier said address space identifier identifying an address space associated with said mapping, said at least a portion of said additional data determining said updating selection comprising said address space identifier.

3. Address translation circuitry according to claim 1, wherein said attribute data comprises a global identifier said global identifier indicating whether or not a mapping is specific to a particular address space or applies to all address spaces, said at least a portion of said additional data determining said updating selection comprising said global identifier.

4. Address translation circuitry according to claim 1, wherein said attribute data comprises an address space identifier said address space identifier identifying an address space associated with said mapping and a global identifier said global identifier indicating whether or not a mapping is specific to a particular address space or applies to all address spaces.

5. Address translation circuitry according to claim 4, wherein said at least a portion of said additional data comprises said address space identifier and said global identifier said updating circuitry being adapted to select an entry to update where said address space identifier does not match in preference to an entry where said global identifier does not match.

6. Address translation circuitry according to claim 5, wherein in response to said attribute data not matching for two or more of said plurality of entries, said updating circuitry is adapted to preferentially select one of said two or more entries having a global identifier indicating that a mapping applies to a particular address space over an entry having a global identifier indicating that a mapping applies to all address spaces.

7. Address translation circuitry according to claim 6, wherein in response to there being two or more entries with a same set of selection properties, said updating circuitry is adapted to select an oldest one of said two or more of entries that was updated least recently.

8. Address translation circuitry according to claim 6, wherein in response to there being two or more entries with a same set of selection properties, said updating circuitry is adapted to select one of said two or more of entries that was accessed least recently.

9. Address translation circuitry according to claim 6, wherein in response to there being two or more entries with a same set of selection properties, said updating circuitry is adapted to select an oldest one of said two or more of entries in a random way.

10. Address translation circuitry according to claim 5, wherein in response to said attribute data matching for all of said plurality of entries, said updating circuitry is adapted to preferentially select one of said plurality of entries having a global identifier indicating that a mapping applies to a particular address space over an entry having a global identifier indicating that a mapping applies to all address spaces.

11. Address translation circuitry according to claim 10, wherein in response to there being two or more entries with a same set of selection properties, said updating circuitry is adapted to select an oldest one of said two or more of entries that was updated least recently.

12. Address translation circuitry according to claim 10, wherein in response to there being two or more entries with a same set of selection properties, said updating circuitry is adapted to select one of said two or more of entries that was accessed least recently.

13. Address translation circuitry according to claim 10, wherein in response to there being two or more entries with a same set of selection properties, said updating circuitry is adapted to select an oldest one of said two or more of entries in a random way.

14. Address translation circuitry according to claim 1, wherein storage in said table is configured to store a mapping of a range in one or more predetermined entries in said table in dependence upon said range of addresses mapped.

15. Address translation circuitry according to claim 14, wherein said ranges of addresses are pages and said table is adapted to store mappings for different sized pages, a mapping for each page of each size having at least one predetermined entry in said table for its storage.

16. Address translation circuitry according to claim 14, wherein said data store comprises a plurality of ways each way having a plurality of said entries, and said data store is configured to store said mapping of said range in any one of said plurality of ways corresponding to said one or more predetermined entries in said table suitable for storing said mapping.

17. Address translation circuitry according to claim 1, wherein said data store comprises a translation lookaside buffer.

18. A method of selecting an entry to update in a data store storing a table comprising a plurality of mappings of ranges of virtual addresses to ranges of physical addresses for a data processor and additional data associated with each of said plurality of mappings, said data processor being responsive to said access requests to access said table to retrieve a corresponding mapping and to access a further store of mappings if said corresponding mapping is not present in said table, said method comprising the steps of:
  receiving an access request from said data processor targeting a virtual address;
  determining if there is an entry in said table for said virtual address requested;
  in response to detecting no entry for said virtual address
    obtaining said mapping from said further store;
    selecting an entry in said data store to update with said obtained mapping; wherein
    said step of selecting said entry comprises selecting a plurality of entries in said table suitable for storing said obtained mapping and determining one of said entries to be overwritten by said received mapping in dependence upon at least a portion of said additional data stored in said one of said plurality of entries, wherein said step of selecting comprises reading said plurality of selected entries and comparing said at least a portion of said additional data stored in each of said plurality of selected entries with a corresponding at least a portion of additional data associated with said received mapping and selecting an entry where said at least a portions of additional data do not match as said entry to update, and said mappings comprise a part of said virtual address, a corresponding part of said physical addresses and said additional data comprises attribute data, said attribute data being indicative of a state of said data processor associated with said mapping.

* * * * *